United States Patent
Ogihara et al.

(10) Patent No.: US 12,221,352 B2
(45) Date of Patent: Feb. 11, 2025

(54) CHLOROSILANE PRODUCING METHOD

(71) Applicant: Tokuyama Corporation, Yamaguchi (JP)

(72) Inventors: Katsuya Ogihara, Yamaguchi (JP); Shoji Iiyama, Yamaguchi (JP); Kunihiko Matsumura, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 704 days.

(21) Appl. No.: 17/435,056

(22) PCT Filed: Feb. 26, 2020

(86) PCT No.: PCT/JP2020/007622
§ 371 (c)(1),
(2) Date: Aug. 31, 2021

(87) PCT Pub. No.: WO2020/179561
PCT Pub. Date: Sep. 10, 2020

(65) Prior Publication Data
US 2022/0162079 A1 May 26, 2022

(30) Foreign Application Priority Data
Mar. 5, 2019 (JP) .................. 2019-039320

(51) Int. Cl.
*C01B 33/107* (2006.01)
(52) U.S. Cl.
CPC .... *C01B 33/10742* (2013.01); *C01P 2004/60* (2013.01)
(58) Field of Classification Search
CPC .......... C01B 33/10472; C01B 33/107
See application file for complete search history.

(56) References Cited

U.S. PATENT DOCUMENTS

| 9,321,653 B2 | 4/2016 | Akiyoshi et al. |
| 2002/0069675 A1 | 6/2002 | Bumgarner et al. |
| 2011/0008236 A1 | 1/2011 | Hinman et al. |
| 2012/0107217 A1 | 5/2012 | Kunert et al. |
| 2012/0301385 A1* | 11/2012 | Akiyoshi .......... C01B 33/10736 423/342 |
| 2014/0363362 A1 | 12/2014 | Ishikawa et al. |

FOREIGN PATENT DOCUMENTS

| CN | 102421706 A | 4/2012 | |
| CN | 103998375 A | 8/2014 | |
| JP | H09169514 A * | 6/1997 | ............. C01B 33/08 |
| JP | 2008081394 A | 4/2008 | |
| JP | 2011063480 A | 3/2011 | |
| JP | 2012515129 T | 7/2012 | |
| JP | 2012530668 A | 12/2012 | |
| JP | 2013212957 A | 10/2013 | |
| JP | 2014162688 A | 9/2014 | |
| WO | 2010078643 A2 | 7/2010 | |
| WO | 2011102265 A | 8/2011 | |

OTHER PUBLICATIONS

Japan Patent Office International Search Report for Application No. PCT/JP2020/007622, Apr. 28, 2020.
English Abstract for JP2011063480 A, Mar. 31, 2011.
English Abstract for WO2011102265 A, Aug. 25, 2011.
English Abstract for JP2013212957 A, Oct. 17, 2013.
English Abstract for JP2014162688 A, Sep. 8, 2014.
English Abstract for JP2008081394A, Apr. 10, 2008.
English Abstract of CN103998375A, Aug. 20, 2014.
English Abstract of CN102421706A, Apr. 18, 2012.
International Preliminary Report on Patentability for Application No. PCT/JP2020/007622, Sep. 16, 2021.

* cited by examiner

*Primary Examiner* — Yong L Chu
(74) *Attorney, Agent, or Firm* — CAHN & SAMUELS, LLP

(57) ABSTRACT

Provided is a method for stably conducting a process for producing chlorosilanes by a chlorination reaction of metallic silicon. When producing chlorosilanes by the chlorination reaction of the metallic silicon, metallic silicon having a sodium content of 1 ppm or more and 90 ppm or less in terms of element and an aluminum content of 1000 ppm or more and 4000 ppm or less in terms of element is used as the metallic silicon. An average particle diameter of the metallic silicon is preferably about 150 μm to 400 μm.

5 Claims, No Drawings

CHLOROSILANE PRODUCING METHOD

This application is a U.S. national stage application of PCT/JP2020/007622 filed on 26 Feb. 2020 and claims priority to Japanese patent document 2019-039320 filed on 5 Mar. 2019, the entireties of which are incorporated herein by reference.

TECHNICAL FIELD

The present invention relates to a novel method for producing chlorosilanes. Specifically, the present invention provides a method capable of stably producing chlorosilanes by a chlorination reaction of metallic silicon.

BACKGROUND OF THE INVENTION

Chlorosilanes used in production of high-purity polysilicon represented by the Siemens method are produced by purifying chlorosilanes obtained by a chlorination reaction of metallic silicon. For example, a general method is to supply a metallic silicon powder and hydrogen chloride to a fluidized bed in a reactor to produce chlorosilanes by the chlorination reaction of metallic silicon. Further, there is also a known method for supplying the metallic silicon powder, tetrachlorosilane and, if necessary, hydrogen to the fluidized bed to produce chlorosilanes by the chlorination reaction of metallic silicon.

The reaction is shown by the following formula. It is known that reactions of the following Formula (1) and Formula (2) occur at a reaction temperature of 300° C. to 360° C. and that a reaction of the following Formula (3) occurs at a reaction temperature of 500° C. to 550° C.

[Chem. 1]

$$Si + 3HCl \rightarrow SiHCl_3 + H_2 \quad (1)$$

$$Si + 4HCl \rightarrow SiCl_4 + 2H_2 \quad (2)$$

$$Si + 3SiCl_4 + 2H_2 \rightarrow 4SiHCl_3 \quad (3)$$

Production of the metallic silicon as a raw material is carried out by using a silicon raw material represented by silica stone and a reducing material such as charcoal, coke, coal, and wood chips, filling an arc furnace with a mixture of the materials as a raw material layer, heating the raw material layer at a high temperature of 2300 K to 2800 K, and reducing the silica stone (see Non-Patent Literature 1).

The metallic silicon produced by the method is obtained as a large block. Since the chlorination reaction of the metallic silicon is generally carried out on a fluidized bed, the metallic silicon block is pulverized into a particle size having an average particle diameter of 400 μm or less and then subjected to the reaction in a form of a metallic silicon powder. As such a metallic silicon powder, a relatively low-purity silicon powder called a metallurgical grade is generally used (Patent Literature 1). The metallic silicon powder of the metallurgical grade usually has a purity of about 99% and is also called "2N (two-nine)" or crude metallic silicon in this technical field.

However, when the metallic silicon after pulverization is fluidized in a fluidized bed type reactor and a chlorination reaction is carried out, the metallic silicon may be aggregated or dimers ($Si_2HCl_5$ and $Si_2Cl_6$) may be contained in the generated chlorosilanes. Such dimers are also called "polymers" in this technical field. The aggregates generated by aggregation of the metallic silicon may have a particle diameter of about 10 cm, remarkably impeding the fluidity of the fluidized bed, and causing a decrease in yield. Further, the generation of the dimers requires purification of the chlorosilanes and causes a decrease in yield.

As a result of intensive studies on factors of the above phenomenon, the inventors of the present invention have obtained the following findings.

The crude metallic silicon may contain aluminum and sodium as impurities. In the chlorination reaction of the metallic silicon, aluminum and sodium are also chlorinated, and it is considered that $NaAlCl_4$ (hereinafter sometimes referred to as "double salt") having a low melting point is generated by the following reaction.

$$NaCl + AlCl_3 \rightarrow NaAlCl_4 \text{(double salt)} \quad \text{[Chem. 2]}$$

The double salt has a melting point of about 185° C. and is liquid at the reaction temperature for chlorosilane production. Therefore, it is considered that metallic silicon particles in the fluidized bed are fused to generate metallic silicon aggregates. Further, the liquid double salt adheres to an inner wall of the reactor together with the silicon particles. As a result, the fluidity of the fluidized bed deteriorates. Occurrence of defective fluidization induces erosion. Furthermore, since heat removal of the reactor is difficult due to adhering materials, a heat spot is generated. As a result, phenomena such as an increase in a generation amount of the chlorosilane dimer and a runaway reaction occur, and such problem may occur in some cases that the chlorination reaction must be stopped.

High purification of the metallic silicon has been carried out for various purposes (Patent Literatures 2 and 3). Also in production of the chlorosilanes, it is conceivable to perform high purification of the crude metallic silicon as a raw material to reduce generation of the silicon aggregates and the dimer. However, the high purification of the metallic silicon as a raw material for producing chlorosilane requires cost.

CITATION LIST

Patent Literature

Patent Literature 1: JP-A-2014-162688
Patent Literature 2: JP-A-2008-81394
Patent Literature 3: JP-T-2012-515129

Non-Patent Literature

Non-Patent Literature 1: Industrial Heating Vol. 46, No. 3 (2009), pp. 1-11, "Current Situation and Issues of Small Arc Furnace"

SUMMARY OF INVENTION

Technical Problem

Therefore, an object of the present invention is to provide a method for stably producing chlorosilanes by a reaction between metallic silicon and hydrogen chloride while preventing aggregation of metallic silicon and adhesion of metallic silicon to a reactor wall in a fluidized bed type reactor when low-purity silicon generally called a metallurgical grade is used as a raw material.

Solution to Problem

The inventors of the present invention have intensively studied the causes of inducing the phenomena such as aggregation and adhesion of a silicon powder during the production of the chlorosilanes. It is known that a relatively large amount of aluminum components are contained in the crude metallic silicon as a raw material. The aluminum components are considered to be derived from silica stone as a raw material. However, there has never been reported that aluminum causes the above problem. The inventors of the present invention have confirmed that the phenomena occur when a large amount of sodium is contained in a production process of the crude metallic silicon. As a result of an intensive research for the phenomena, the inventors of the present invention have presumed that the generation of the double salt having a low melting point due to sodium and thus the fusion of a metallic silicon powder cause the generation of the silicon aggregates and the adhesion of the metallic silicon powder to the inner wall of the reactor.

Therefore, the following findings are obtained by searching for a source of sodium as a cause of the generation of the double salt. In a step of producing the crude metallic silicon, the silica stone is reduced and the obtained silicon melt is poured into a mold at a high temperature. In this case, a release agent is used at a boundary surface between the melt and the mold, but when a water glass-based material is used as the release agent, sodium in the water glass is contained into the melt, and a sodium concentration of the obtained crude metallic silicon increases. Further, calcium carbonate may be charged into a melting furnace for a purpose of keeping the used melting furnace warm until the next use. When calcium carbonate having a low purity is used, sodium as an impurity contained in the calcium carbonate may remain in the melting furnace without being separated, and the sodium may be contained in crude metallic silicon to be produced in the next reaction. Furthermore, in a method for producing the crude metallic silicon, sodium silicate is often used as an adhesive for refractory bricks constituting the melting furnace, and the sodium concentration increases in the metallic silicon obtained immediately after starting the furnace.

Then, such finding has been obtained that when a sodium component contained in the crude metallic silicon exceeds a specific amount, the sodium component reacts with an aluminum component originally contained in the crude metallic silicon in the fluidized bed to form the double salt having a low melting point, causing aggregation of the crude metallic silicon powder and adhesion of the metallic silicon to the inner wall of the fluidized bed type reactor. Based on the finding, the inventors of the present invention have found that all of problems can be solved by controlling a sodium content of the crude metallic silicon to a specific value or less. Thus, the present invention has been completed.

That is, the present invention provides a method for producing chlorosilanes, the method including: when producing chlorosilanes by a chlorination reaction of metallic silicon, using, as the metallic silicon, metallic silicon having a sodium content of 1 ppm or more and 90 ppm or less in terms of element and an aluminum content of 1000 ppm or more and 4000 ppm or less in terms of element.

The metallic silicon preferably has an average particle diameter of 150 μm to 400 μm from a viewpoint of facilitating formation of a fluidized bed.

Advantageous Effects of Invention

According to the method of the present invention, in the chlorination reaction of the metallic silicon, it is possible to prevent the formation of the double salt having a low melting point which is formed by a reaction of aluminum and sodium contained in the crude metallic silicon and to effectively prevent the aggregation of the silicon powder and the adhesion of the metallic silicon to the inner wall of the fluidized bed type reactor by using the crude metallic silicon whose sodium content is reduced to a specific value or less. As a result, generation of silicon aggregates in the fluidized bed is prevented, generation of dimers (polymers) is reduced, and chlorosilanes can be stably produced.

DESCRIPTION OF EMBODIMENTS

In the present invention, as a method for producing chlorosilanes by a chlorination reaction of crude metallic silicon, a known method using a fluidized bed type reactor is adopted without particular limitation.

For example, there is a method for producing chlorosilanes by supplying the crude metallic silicon powder and a chlorine source gas such as hydrogen chloride and tetrachlorosilane to a fluidized bed of a fluidized bed type reactor and carrying out a chlorination reaction of metallic silicon. In the present invention, the chlorosilanes include monosilanes such as dichlorosilane, trichlorosilane, and tetrachlorosilane.

As the hydrogen chloride, various kinds of hydrogen chlorides industrially available can be used. Regarding supply amounts of the metallic silicon and the hydrogen chloride, as long as the metallic silicon and the hydrogen chloride can be supplied at a speed at which chlorination is possible and a fluidized bed can be formed, known conditions are adopted without particular limitation.

A reaction temperature in the reaction is appropriately determined in consideration of a material and a capacity of a reactor, a catalyst, and the like, and is generally set in a range of 200° C. to 500° C., and preferably in a range of 250° C. to 450° C.

Another method for producing chlorosilanes also includes a method in which a metallic silicon powder, tetrachlorosilane, and hydrogen are supplied to a fluidized bed together with a catalyst represented by copper silicide and a chlorination reaction of metallic silicon is carried out.

In the above method, regarding supply amounts of the metallic silicon, the tetrachlorosilane, and the hydrogen, as long as the metallic silicon, the tetrachlorosilane, and the hydrogen can be supplied at a speed at which chlorination is possible and a fluidized bed can be formed, known conditions are adopted without particular limitation. Further, a reaction temperature in the reaction is appropriately determined in consideration of a material and a capacity of a reactor, a catalyst, and the like, and is generally set in a range of 400° C. to 700° C., and preferably in a range of 450° C. to 600° C.

The method for producing chlorosilanes of the present invention is characterized in that a sodium content in the crude metallic silicon used as a raw material in the above method is 1 ppm or more and 90 ppm or less, preferably 3 ppm or more and 50 ppm or less, and more preferably 5 ppm or more and 40 ppm or less in mass in terms of element. An aluminum content in the crude metallic silicon is the same as that of general 2N grade metallic silicon, and is 1000 ppm or more and 4000 ppm or less, preferably 1500 ppm or more and 2500 ppm or less in mass in terms of element.

The purity of the crude metallic silicon is also preferably the same as that of the general 2N grade metallic silicon, and the silicon content is about 99% in mass in terms of element, more specifically 98.5% to 99.4%, and may be 99.0% to 99.4%.

The purity of the metallic silicon and the sodium and aluminum contents are measured according to a method described in Examples.

As described above, the metallic silicon is produced by using a silicon raw material represented by silica stone and a reducing material such as charcoal, coke, coal, and wood chips, filling an arc furnace with a mixture of the materials as a raw material layer, heating the raw material layer at a high temperature of 2300 K to 2800 K, and reducing the silica stone, and is thus obtained as a large block having a weight of about 1000 kg to 2000 kg. In order to be used for production of chlorosilanes, the large block is crushed and made into metallic silicon having a size suitable for the reaction.

However, as described above, in a production process of the metallic silicon, in a case in which a large amount of release agent containing sodium is adhered to a mold into which molten silicon is poured, or in a case in which a raw material of the next reaction comes into contact with low-purity calcium carbonate when the low-purity calcium carbonate is used for the purpose of keeping a melting furnace warm at a stop time of the reaction, a sodium concentration in the metallic silicon block increases. Further, when a melting furnace for producing the metallic silicon is newly installed, sodium silicate used as an adhesive for refractory bricks constituting the melting furnace may temporarily increase the sodium concentration of the generated metallic silicon immediately after start of the melting furnace.

Contamination of the silicon block due to the sodium also remains in the obtained metallic silicon even if the silicon block is pulverized, so that double salt of sodium and aluminum are generated in the fluidized bed type reactor to cause the problem.

In this way, the present invention makes it possible to reduce generation amounts of the double salt of sodium and aluminum in the fluidized bed type reactor and stably produce chlorosilanes by controlling the sodium content in the metallic silicon within the above range.

In the present invention, a method for reducing the sodium concentration in the silicon powder to fall within the above range is not particularly limited, and a method for eliminating the contamination source is effective. Specific examples include a method in which a sodium-free release agent, for example, metallic silicon or carbon, is used as a release agent of a mold into which metallic silicon obtained from a melting furnace is poured, a method in which calcium carbonate having a low sodium content is used as a heat-retaining agent of a melting furnace, and a method in which, after a melting furnace is newly built up, heating in an empty state is performed until an influence of sodium derived from sodium silicate used as an adhesive is eliminated, and then metallic silicon is produced.

When 2N grade crude metallic silicon obtained by a general method is highly purified to 4N grade or more, if such high-purity silicon is used as a raw material, the same effect is expected, but cost for purification is required and the production cost of chlorosilane also increases. In the present invention, based on the above findings, an unexpected effect is achieved by reducing content of sodium which has not been focused in production of the general 2N grade crude metallic silicon.

In the present invention, a lower limit of the sodium content contained in the crude metallic silicon as the raw material is 1 ppm. It is technically easy to make the sodium content less than 1 ppm, but the cost is increased as described above. Further, there is no difference in the effect obtained even when the sodium content is less than 1 ppm.

In the present invention, a lower limit of the aluminum content contained in the crude metallic silicon as the raw material is 1000 ppm. It is technically easy to make the aluminum content less than 1000 ppm, but the cost is increased as described above. Further, there is no difference in the effect obtained even when the aluminum content is less than 1000 ppm.

In the present invention, the metallic silicon may have a size that enables t fluidization in a fluidized bed, and an average particle diameter thereof is 150 μm to 400 μm, and particularly preferably 180 μm to 300 μm. The average particle diameter of silicon is measured according to the method described in Examples. A stable fluidized bed can be obtained by setting the average particle diameter of the silicon within the above range.

EXAMPLES

Hereinafter, Examples will be shown to more specifically explain the present invention, but the present invention is not limited to these Examples.

In Examples and Comparative Examples, measurement of the sodium, aluminum, and silicon contents in the metallic silicon, measurement of the average particle diameter of the metallic silicon, measurement of the generation amount of the dimer (polymer) in the generated chlorosilane, and evaluation of the presence or absence of generation of the metallic silicon aggregates in the reaction were performed by the following methods.

(Sodium and Aluminum Contents)

A silicon sample of 0.5 g to 1.0 g was precisely weighed into a 50 ml Teflon (registered trademark) beaker. 30 ml of 7N—$HNO_3$ was added thereto. Further, HF (50 mass %) was gradually added to decompose the sample. The beaker was placed on a hot plate, heated at a temperature of 140° C. for 2 hours, then heated at a hot plate temperature of 160° C. for 1 hour, and further heated at a hot plate temperature of 140° C. until an amount of the residual liquid was small. Into the beaker, as a recovery reagent, 2 ml of HCl (35 mass %) and 5 ml of pure water were further added and the beaker was heated at a hot plate temperature of 140° C. for 5 minutes. The beaker was unloaded from the hot plate and cooled to room temperature. The sample liquid in the beaker was filtered into a 100 ml volumetric flask made of polyethylene by using a polyethylene funnel and a filter paper, and was increased to constant volume of 100 ml with pure water. The liquid was introduced into a two-wave sequential plasma emission spectrometer as an ICP-OES apparatus and was analyzed.

(Silicon Content)

3 g to 10 g of crude metallic silicon used as a raw material is collected into a mortar. The collected silicon is ground with a pestle. The obtained powdery sample was placed on a sample table dedicated to fluorescence X-ray, and the silicon content was measured with a fluorescent X-ray analyzer (ZSX Primus II, manufactured by Rigaku Corporation).

(Average Particle Diameter of Metallic Silicon)

<Collection Method>

About 1 kg of metallic silicon is collected from a 1-ton flexible container and transferred into a glass container. After the collected sample is well stirred, an appropriate amount for the following analysis is collected.

<Analysis Method>

A cumulative diameter when about 100 g of the metallic silicon powder is classified by using a vibration sieving machine having a plurality of sieves and each fraction is cumulatively added from a minimum fraction, and the diameter at 50 mass % is defined as an average particle diameter (median diameter). More specifically, a vibration sieving machine on which sieves adapted to a test sieve defined in JIS Z 8801-1 and having nominal openings of 500 μm, 355 μm, 250 μm, 212 μm, 150 μm, 106 μm, and 45 μm are mounted in a stacked manner is used for classification.
(Generation Amount of Dimer)
<Collection Method>

A metal silicon powder and hydrogen chloride (HCl) were supplied to the fluidized bed type reactor and reacted to produce trichlorosilane, and a chlorosilane gas and a metallic silicon powder produced were recovered from an outlet of the fluidized bed type reactor after generation of the trichlorosilane. The obtained chlorosilane gas and metallic silicon were passed through a filter to remove the metallic silicon. The chlorosilane gas was cooled with a heat exchanger to obtain a chlorosilane liquid, and the chlorosilane liquid was stored in a drum. An appropriate amount of the chlorosilane liquid for analysis was collected from the drum.

Examples 1 to 4

Silica stone is reduced in the melting furnace to obtain a silicon melt. By the method in which the sodium-free release agent, for example, metallic silicon or carbon was used as the release agent of the mold into which the metallic silicon obtained was poured, the method in which the calcium carbonate having a low sodium content was used as the heat-retaining agent of the melting furnace, and a method in which, after the melting furnace was newly built up, heating in an empty state was performed until the influence of the sodium derived from the sodium silicate used as the adhesive was eliminated, and then the metallic silicon was produced, an amount of sodium in the production process was limited and metallic silicon having a controlled sodium content shown in Table 1 was obtained.

The obtained metallic silicon was crushed to obtain crude metallic silicon having an average particle diameter shown in Table 1, and the above evaluation was performed. The results are shown in Table 1.

Comparative Example 1

The above evaluation was performed by using commercially available 2N grade crude metallic silicon having a composition and an average particle diameter shown in Table 1. The results are shown in Table 1.

TABLE 1

|  | Crude metallic silicon | | | | Evaluation result | |
| --- | --- | --- | --- | --- | --- | --- |
|  | Na Content [ppm] | Al Content [ppm] | Si Content [mass %] | Average particle diameter [μm] | Generation amount of dimer [mol %] | Silicon aggregate |
| Example 1 | 5 | 1900 | 99.4 | 230 | <0.001 | None |
| Example 2 | 10 | 1800 | 99.4 | 280 | <0.001 | None |
| Example 3 | 30 | 2100 | 99.2 | 200 | <0.001 | None |
| Example 4 | 79 | 1600 | 99.1 | 220 | 0.01 | A few of aggregates of 1 kg or less |
| Comparative Example 1 | 110 | 1700 | 99.2 | 190 | 0.53 | Many of aggregates of 1 kg or more |

<Analysis Method>

Generation amounts of dimers ($Si_2HCl_5$ and $Si_2HCl_6$) in all chlorosilanes were measured by gas chromatography (GC-TCD) using a thermal conductivity detector under the following conditions.

Equipment used: C-R8A manufactured by Shimadzu Corporation

Carrier gas: hydrogen (G2)

The generation amounts of the dimers increase when a heat spot is formed in the reactor, and thus this method can be adopted as a method for evaluating defective fluidization.
(Presence or Absence of Generation of Metallic Silicon Block)

Chlorosilane was produced by the fluidized bed type reactor in the same manner as above (Generation Amounts of Dimers). The reactor was stopped after running for 30 days, and a bottom plate under the fluidized floor was visually observed to confirm the presence or absence of silicon aggregates (mass: 1 kg or more).

The invention claimed is:

1. A method for producing chlorosilanes, comprising:
reacting a) a chlorine source gas and b) metallic silicon having a sodium content of 1 ppm or more and 90 ppm or less in terms of element, and an aluminum content of 1600 ppm or more and 2100 ppm or less in terms of element; and
producing a chlorosilane.

2. The method for producing chlorosilanes according to claim 1, wherein the chlorine source gas is hydrogen chloride or tetrachlorosilane.

3. The method for producing chlorosilanes according to claim 1, wherein the chlorine source gas is hydrogen chloride.

4. The method for producing chlorosilanes according to claim 1, wherein the chlorine source gas is tetrachlorosilane.

5. The method for producing chlorosilanes according to claim 1, wherein an average particle diameter of the metallic silicon is 150 μm to 400 μm.

* * * * *